(12) United States Patent
Su

(10) Patent No.: US 9,638,832 B1
(45) Date of Patent: May 2, 2017

(54) OPTICAL LENS

(71) Applicant: Genius Electronic Optical Co., Ltd., Taichung (TW)

(72) Inventor: Guo-Jin Su, Taichung (TW)

(73) Assignee: Genius Electronic Optical Co., Ltd., Taichung (TW)

(\*) Notice: Subject to any disclaimer, the term of this patent is extended or adjusted under 35 U.S.C. 154(b) by 0 days.

(21) Appl. No.: 15/172,164

(22) Filed: Jun. 3, 2016

(30) Foreign Application Priority Data

Apr. 22, 2016 (CN) .......................... 2016 1 0256163

(51) Int. Cl.
*G02B 27/00* (2006.01)
*G02B 1/11* (2015.01)
*G02B 3/00* (2006.01)
*G02B 7/02* (2006.01)

(52) U.S. Cl.
CPC ............... *G02B 1/11* (2013.01); *G02B 3/00* (2013.01); *G02B 7/02* (2013.01)

(58) Field of Classification Search
CPC ... G02B 1/11; G02B 7/02; G02B 3/00; G02B 1/11
See application file for complete search history.

(56) References Cited

U.S. PATENT DOCUMENTS

2013/0076971 A1\* 3/2013 Nishimoto ........... G02B 13/004
348/360

\* cited by examiner

*Primary Examiner* — Joseph P Martinez
(74) *Attorney, Agent, or Firm* — Jianq Chyun IP Office

(57) ABSTRACT

An optical lens includes a lens, at least one light absorbing layer, and at least one optical membrane. The lens has a central region and a peripheral region surrounding the central region. The at least one light absorbing layer and the at least one optical membrane are disposed on the lens, located in the peripheral region and expose the central region. Each optical membranes includes at least one first layer and at least one second layer. Refraction index of the at least one second layer is lower than refraction index of the at least one first layer. The at least one first layer and the at least one second layer are stacked alternatively, and at least one of extinction coefficients of the at least one first layer and the at least one second layer within a wavelength range of visible light is larger than zero.

14 Claims, 12 Drawing Sheets

OPTICAL LENS

CROSS-REFERENCE TO RELATED APPLICATION

This application claims the priority benefit of Chinese application serial no. 201610256163.5, filed on Apr. 22, 2016. The entirety of the above-mentioned patent application is hereby incorporated by reference herein and made a part of this specification.

BACKGROUND OF THE INVENTION

Field of the Invention

The invention relates to an optical element, and particularly relates to an optical lens.

Description of Related Art

Specifications of portable electronic products change rapidly, and the optical lens assemblies serving as key components are also developed in diversified ways.

Applications of the optical lens sets not only include image capturing and video recording, but also include environment monitoring, driving data recording, etc., and along with progress of image sensing technology, consumers have higher demand on imaging quality.

In the optical imaging lens, light beams entering the optical lens with large incident angle are easily reflected or refracted by edge(s) of one or more optical lenses to form stray light. In order to reduce negative impact on imaging quality owning to stray light, a light shielding element is applied or an edge of the optical lens is marked by a black ink to filter stray light in the conventional art. However, the optical imaging lens disposed with the light shielding element is hard to keep a better assembly accuracy and has an issue affecting imaging quality due to poor assembly. On the other hand, the effect of improving stray light issue by marking the black ink at the edge of the optical lens is limited. Hence, how to produce an optical lens that improves stray light issue has always been a concern of industry, government, and academia.

SUMMARY OF THE INVENTION

The invention provides an optical lens, which is capable of improving stray light issue.

An embodiment of the invention provides an optical lens including a lens, at least one light absorbing layer, and at least one optical membrane. The lens has a central region and a peripheral region surrounding the central region. The at least one light absorbing layer is disposed on the lens, where each light absorbing layer is located in the peripheral region and exposes the central region. The at least one light optical membrane is disposed on the lens, and the at least one optical membrane and the at least one light absorbing layer overlap in an optical axis direction of the optical lens, where each optical membrane is located in the peripheral region and exposes the central region. Each optical membrane includes at least one first layer and at least one second layer. Refraction index of the at least one second layer is lower than refraction index of the at least one first layer. The at least one first layer and the at least one second layer are stacked alternatively, and at least one of extinction coefficients of the at least one first layer and the at least one second layer within a wavelength range of visible light is larger than zero.

In an embodiment of the invention, a number of the at least one light absorbing layer and a number of the at least one optical membrane are respectively one, and the light absorbing layer and the light optical membrane are respectively disposed on two opposing surfaces of the lens.

In an embodiment of the invention, a number of the at least one light absorbing layer and a number of the at least one optical membrane are respectively one. The light absorbing layer and the optical membrane are disposed on a same surface of the lens, and the optical membrane is located between the light absorbing layer and the lens.

In an embodiment of the invention, a number of the at least one light absorbing layer and a number of the at least one optical membrane are respectively one. The light absorbing layer and the optical membrane are disposed on a same surface of the lens, and the light absorbing layer is located between the optical membrane and the lens.

In an embodiment of the invention, a number of the at least one light absorbing layer is one. A number of the at least one optical membrane is two. The light absorbing layer and the optical membranes are disposed on a same surface of the lens, and the light absorbing layer is located between the optical membranes.

In an embodiment of the invention, a number of the at least one light absorbing layer is two. A number of the at least one optical membrane is one. The light absorbing layers and the optical membrane are disposed on a same surface of the lens, and the optical membrane is located between the light absorbing layers.

In an embodiment of the invention, a material of the at least one light absorbing layer includes $Ti_xO_y$ or $Cr_xO_y$, x and y are respectively larger than zero, and $(x+y) \leq 1$. Light absorbance of each light absorbing layer is larger than transmittance of the light absorbing layer plus reflectance of the light absorbing layer.

In an embodiment of the invention, a material of the at least one light absorbing layer includes $Ti_xO_y$ or $Cr_xO_y$, x and y are respectively larger than zero, and $(x+y) \leq 1$. Transmittance of each first layer is within a range of 20% to 80%.

In an embodiment of the invention, a material of the at least one second layer includes silicon dioxide or silicon oxide.

In an embodiment of the invention, the peripheral region has at least one first strip shape gap region connected to the central region, and the at least one light absorbing layer and the at least one optical membrane further expose the at least one first strip shape gap region respectively.

In an embodiment of the invention, a point connecting each first strip shape gap region and the central region is defined as a first connecting point. A straight line passing through the first connecting point from a center of the lens along a radial direction is defined as a first radius line. An angle between orthogonal projections of each first strip shape gap region and the first radius line on a reference plane which is vertical to the optical axis direction is within a range of 30 degrees to 60 degrees.

In an embodiment of the invention, each first strip shape gap region is connected between the central region and a peripheral edge of the lens.

In an embodiment of the invention, the peripheral region further has at least one second strip shape gap region not connected to the central region, and the at least one light absorbing layer and the at least one optical membrane further expose the at least one second strip shape gap region respectively.

In an embodiment of the invention, each first strip shape gap regions is connected between the central region and a peripheral edge of the lens.

Based on the above, advantageous effects of the optical lens according to the embodiments of the invention are as follows. By disposing at least one light absorbing layer and at least one optical membrane on the peripheral region of the lens, transmittance and reflectance of the peripheral region of the lens are reduced. Thus, the stray light issue is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
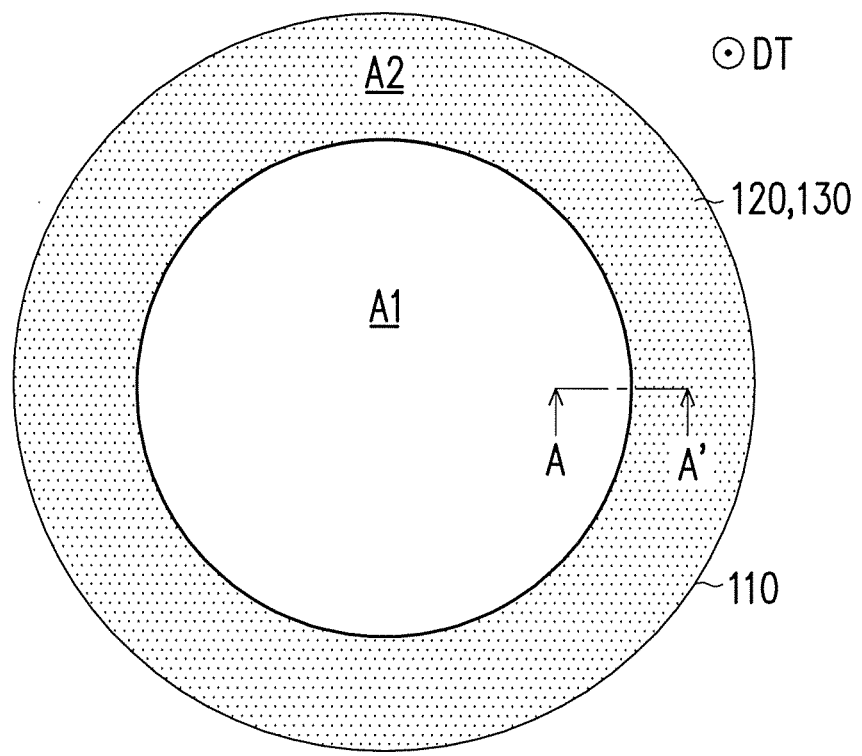
FIG. 1A is a top schematic view illustrating an optical lens according to a first embodiment of the present invention.
Figure 1B:
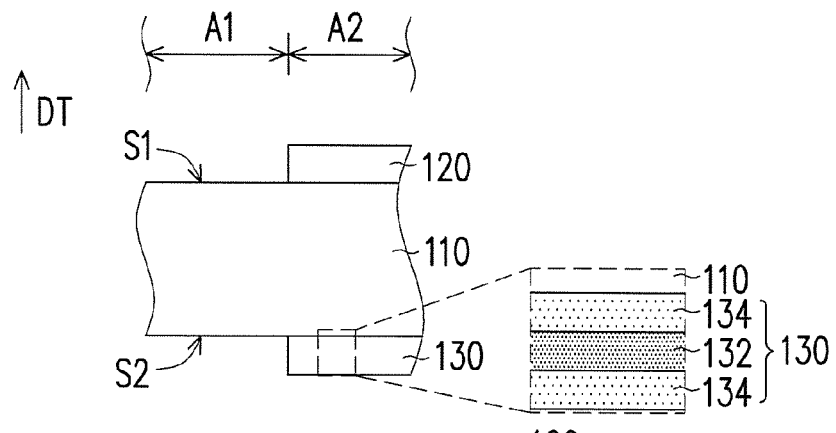
FIG. 1B is a first cross-sectional schematic view along a section line A-A' in FIG. 1A.
Figure 1C:
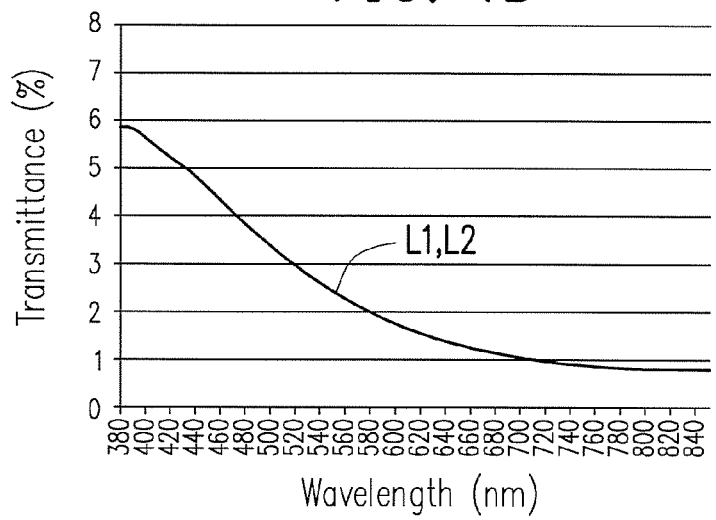
FIG. 1C and FIG. 1D are graphs respectively illustrating transmittance curves and reflectance curves of a peripheral region in FIG. 1B.
Figure 1D:
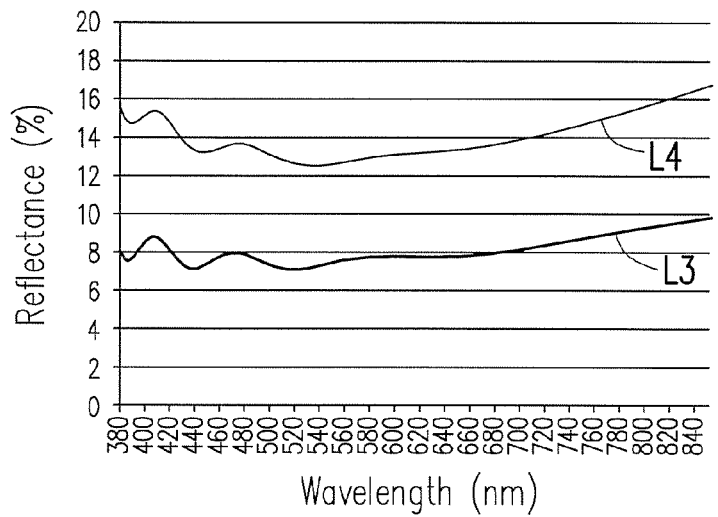

FIG. 1A is a top schematic view illustrating an optical lens according to a first embodiment of the present invention. FIG. 1B is a first cross-sectional schematic view along a section line A-A' in FIG. 1A. FIG. 1C and FIG. 1D are graphs respectively illustrating transmittance curves and reflectance curves of a peripheral region in FIG. 1B.

Referring to FIG. 1A and FIG. 1B, an optical lens 100 includes a lens 110, at least one light absorbing layer 120, and at least one optical membrane 130. The lens 110 has refractive power, and the lens 110 may be spherical lens or aspherical lens. The lens 110 has a central region A1 and a peripheral region A2 surrounding the central region A1 (The thick solid line in FIG. 1A is marked as the boundary between the central region A1 and the peripheral region A2). The central region A1 is defined as an optical effective radius region which is adapted to allow light beams to pass through. A diameter of the central region A1 is clear aperture of the lens 110, and a range of diameter tolerance is approximately 0.2 mm to 0.6 mm.

The at least one light absorbing layer 120 is disposed on the lens 110, where each light absorbing layer 120 is located in the peripheral region A2 and exposes the central region A1 to reduce transmittance of the peripheral region A2. In optical theory, after a 100% light beam passes through a medium, the energy will be split into three parts including light absorbance, transmittance and reflectance. Light absorbance plus transmittance plus reflectance is equal to 100%. Light absorbance of the at least one light absorbing layer 120 after allowing light beams to pass through is larger than transmittance plus reflectance. For example, transmittance of the at least one light absorbing layer 120 is below 1%, reflectance of the at least one light absorbing layer 120 is approximately 15%, and light absorbance of the at least one light absorbing layer 120 is approximately 84%. However, the invention is not limited thereto. In the present embodiment, a material of the at least one first layer 120 may include $Ti_xO_y$ or $Cr_xO_y$, where x and y are respectively larger than zero, and $(x+y) \leq 1$.

The at least one optical membrane 130 is disposed on the lens 110, and the at least one optical membrane 130 and the at least one light absorbing layer 120 overlap in an optical axis direction DT of the optical lens 100, where each optical membrane 130 is located in the peripheral region A2 and exposes the central region A1. Each optical membrane 130 includes at least one first layer 132 and at least one second layer 134. Refraction index of the at least one second layer 134 is lower than refraction index of the at least one first layer 132. The at least one first layer 132 and the at least one second layer 134 are stacked alternatively. Accordingly, reflectance of the peripheral region A2 is reduced by satisfying conditions of destructive interference, so as to achieve the effect of anti-reflection. In the present embodiment, a material of the at least one first layer 132 may include $Ti_xO_y$, or $Cr_xO_y$, where x and y are respectively larger than zero, and (x+y)≤1. In addition, a material of the at least one second layer 134 may include silicon dioxide or silicon oxide. However, the invention is not limited thereto.

It should be mentioned that the at least one light absorbing layer 120 is mainly used to absorb most part of light beams entering the at least one light absorbing layer 120 to reduce transmittance. The at least one first layer 132 and the at least one second layer 134 are mainly used to modulate optical path difference to accomplish the effect of anti-reflection by satisfying conditions of destructive interference (i.e., effect for reducing reflectance).

Furthermore, at least one of extinction coefficients of the at least one first layer 132 and the at least one second layer 134 within a wavelength range of visible light is larger than zero. Accordingly, the at least one optical membrane 130 not only can reduce reflectance, but also can enhance light absorbance by designing the extinction coefficients larger than zero to reduce transmittance at the same time. However, to achieve the effect of reducing reflectance, transmittance of each first layer 132 is designed to be higher than transmittance of each light absorbing layer 120. For example, transmittance of each first layer 132 is within a range of 20% to 80%, which is larger than transmittance (1%) of each light absorbing layer 120, but the invention is not limited thereto. A material of the first layer 132 having the extinction coefficient may include $Ti_xO_y$ or $Cr_xO_y$, and a material of the second layer 134 having the extinction coefficient may include silicon oxide. However, the invention is not limited thereto. A wavelength range of visible light means that wavelength of light is within a range of 400 nm to 700 nm.

In the present embodiment, a number of the at least one light absorbing layer 120 and a number of the at least one optical membrane 130 are respectively one. The light absorbing layer 120 and the optical membrane 130 are disposed on two opposing surfaces S1 and S2 of the lens 110, where one of the surfaces S1 and S2 is an object-side surface, and the other one is an image-side surface.

In the optical membrane 130, the number of the at least one first layer 132 may be one, and the number of the at least one second layer 134 may be two. However, the invention is not limited thereto. In simulation data plots of FIG. 1C, the material of the light absorbing layer 120 is $Ti_3O_5$ (i.e., x is three-eighths, and y is five-eighths), and the thickness of the light absorbing layer 120 is 510 nm. The material of the first layer 132 is $Ti_3O_5$, and the thickness of the first layer 132 is 85 nm. A material of the second layers 134 is silicon dioxide, and the thicknesses of the second layers 134 arranged along the optical axis direction DT of the optical lens 100 are sequentially 74 nm and 15 nm. Under this structure, transmittance of the peripheral region A2 in the optical axis direction DT and transmittance of the peripheral region A2 in a reverse direction may be below 6% (Referring to the curves L1, L2 in FIG. 1C) within a wavelength range of visible light (400 nm to 700 nm). Reflectance of the peripheral region A2 in the optical axis direction DT may be below 9% (Referring to the curve L3 in FIG. 1D) within a wavelength range of visible light (400 nm to 700 nm), and reflectance of the peripheral region A2 in the reverse direction of the optical axis direction DT may be below 16% (Referring to the curve L4 in FIG. 1D) within a wavelength range of visible light (400 nm to 700 nm). It should be mentioned that the number, the thickness, the material or the relative arrangement relationship of the at least one light absorbing layer 120 and the at least one optical membrane 130 (including the at least one first layer 132 and the at least one second layer 134) can be altered based on design requirements, and the invention is not limited thereto.

Figure 2A:
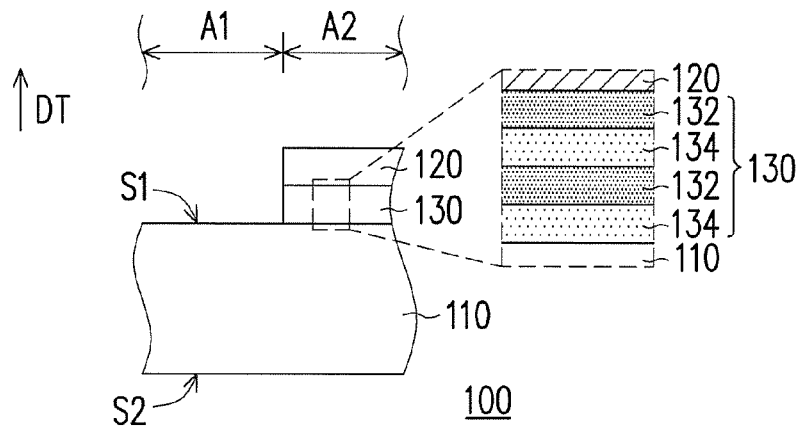
FIG. 2A is a second cross-sectional schematic view along the section line A-A' in FIG. 1A.
Figure 2B:
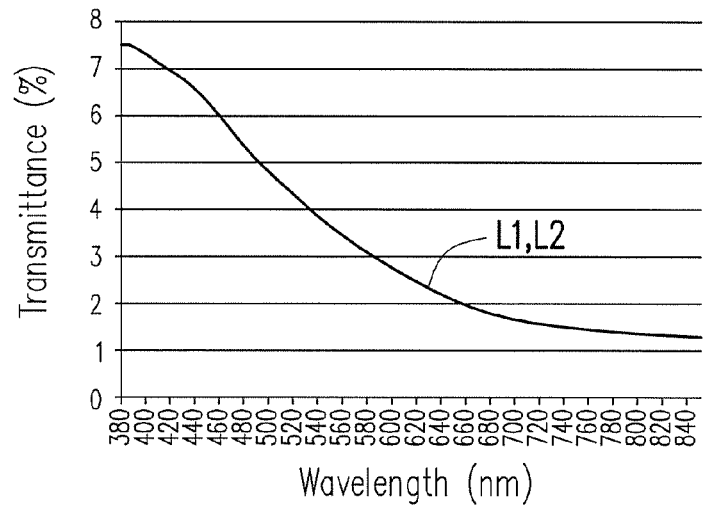
FIG. 2B and FIG. 2C are graphs respectively illustrating transmittance curves and reflectance curves of a peripheral region in FIG. 2A.
Figure 2C:
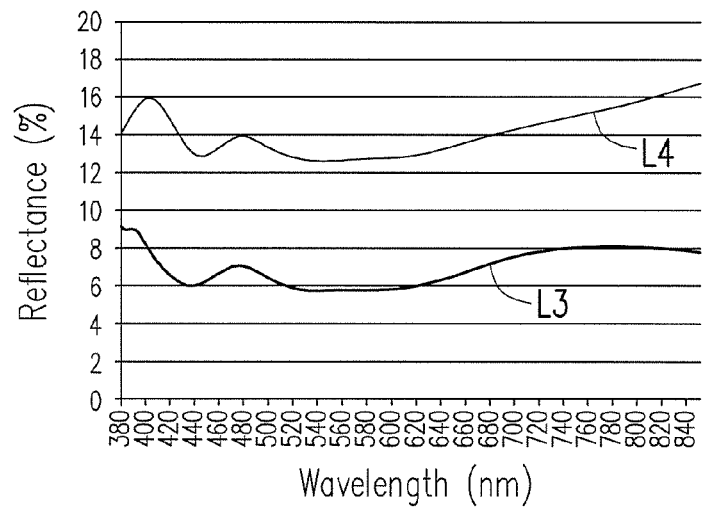
Figure 3A:
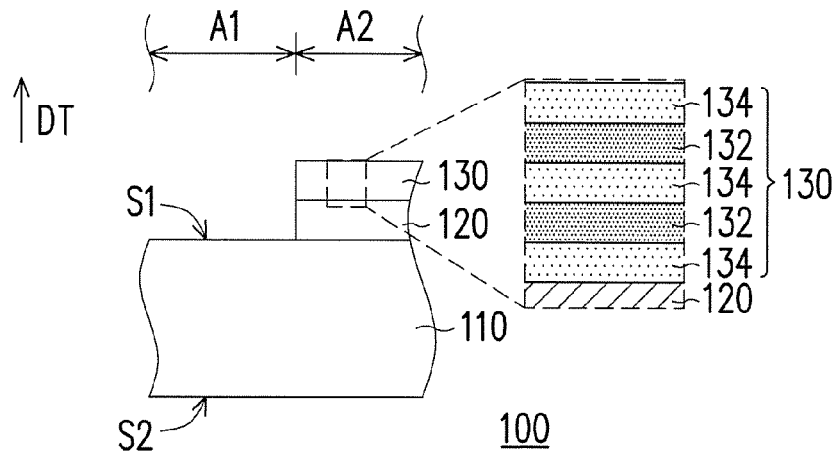
FIG. 3A is a third cross-sectional schematic view along the section line A-A' in FIG. 1A.
Figure 3B:
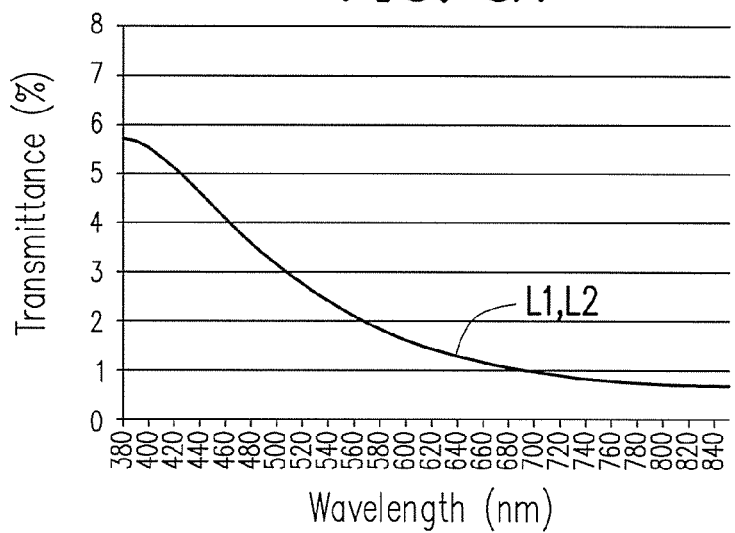
FIG. 3B and FIG. 3C are graphs respectively illustrating transmittance curves and reflectance curves of a peripheral region in FIG. 3A.
Figure 3C:
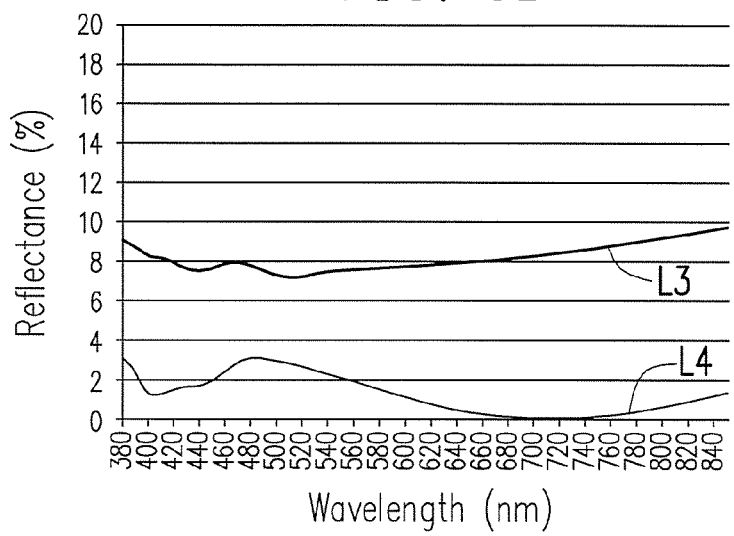
Figure 4A:
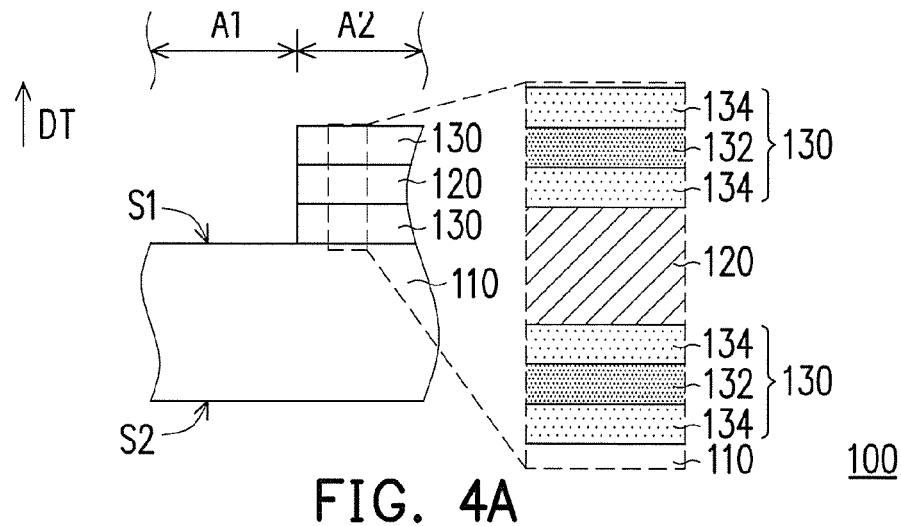
FIG. 4A is a fourth cross-sectional schematic view along the section line A-A' in FIG. 1A.
Figure 4B:
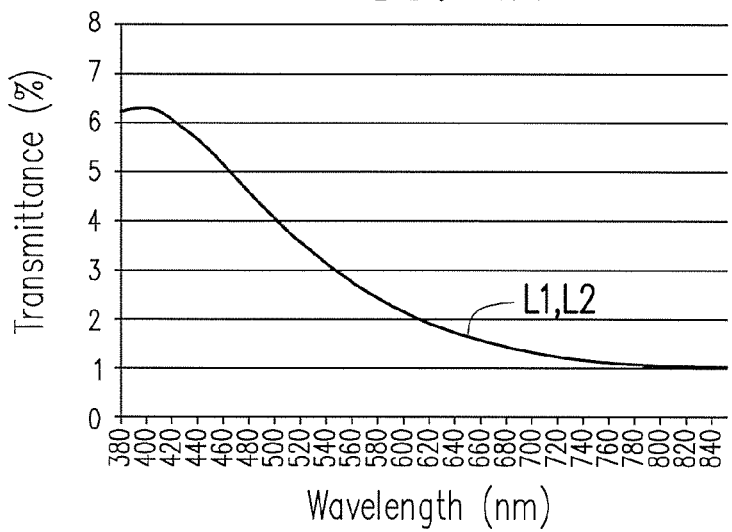
FIG. 4B and FIG. 4C are graphs respectively illustrating transmittance curves and reflectance curves of a peripheral region in FIG. 4A.
Figure 4C:
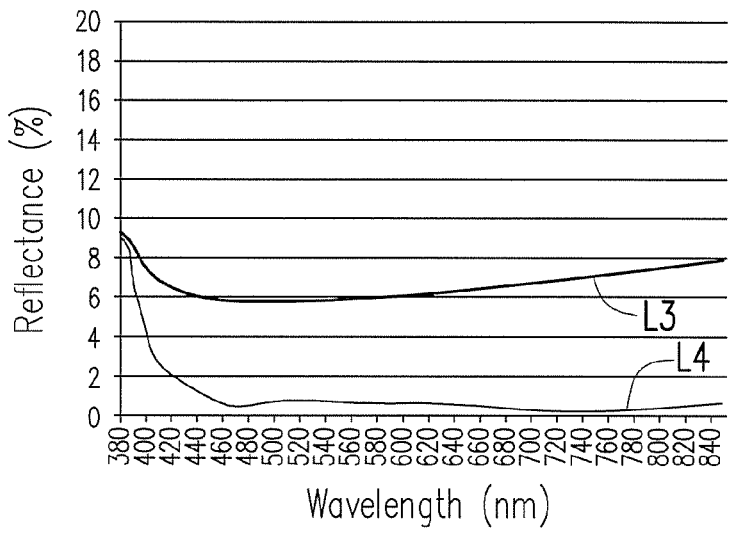
Figure 5A:
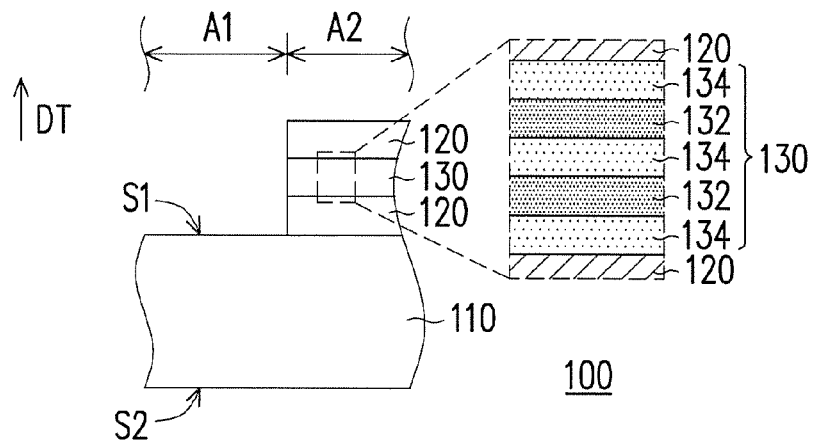
FIG. 5A is a fifth cross-sectional schematic view along the section line A-A' in FIG. 1A.
Figure 5B:
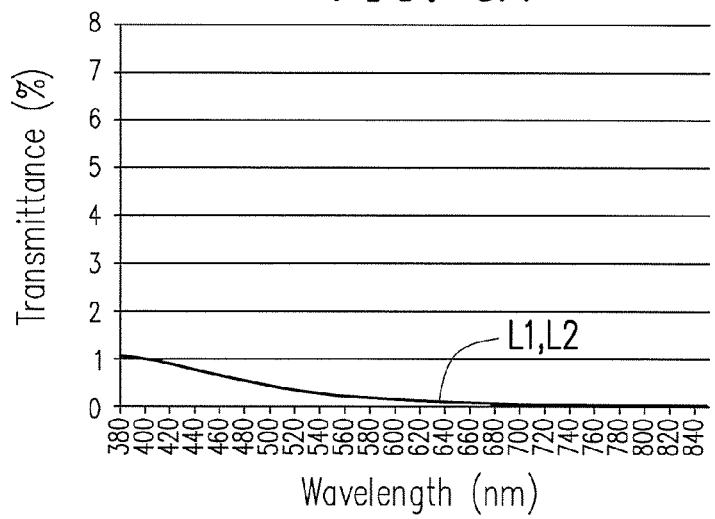
FIG. 5B and FIG. 5C are graphs respectively illustrating transmittance curves and reflectance curves of a peripheral region in FIG. 5A.
Figure 5C:
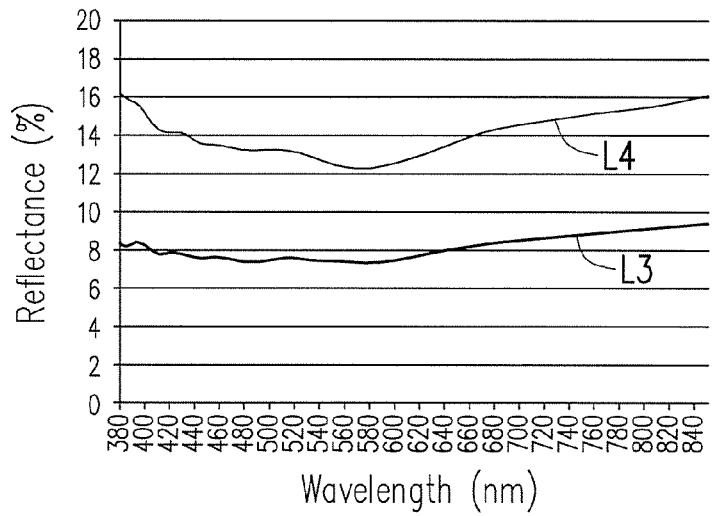

The following paragraphs will explain other cross-section views of the optical lens 100 in FIG. 1A in collaboration with FIG. 2A to FIG. 5C. FIG. 2A is a second cross-sectional schematic view along the section line A-A' in FIG. 1A. FIG. 2B and FIG. 2C are graphs respectively illustrating transmittance curves and reflectance curves of a peripheral region in FIG. 2A. FIG. 3A is a third cross-sectional schematic view along the section line A-A' in FIG. 1A. FIG. 3B and FIG. 3C are graphs respectively illustrating transmittance curves and reflectance curves of a peripheral region in FIG. 3A. FIG. 4A is a fourth cross-sectional schematic view along the section line A-A' in FIG. 1A. FIG. 4B and FIG. 4C are graphs respectively illustrating transmittance curves and reflectance curves of a peripheral region in FIG. 4A. FIG. 5A is a fifth cross-sectional schematic view along the section line A-A' in FIG. 1A. FIG. 5B and FIG. 5C are graphs respectively illustrating transmittance curves and reflectance curves of a peripheral region in FIG. 5A.

The following paragraphs will only explain main differences between FIG. 2A, FIG. 3A, FIG. 4A, FIG. 5A and FIG. 1B. The similar or the same elements and related descriptions can refer to the corresponding contents in FIG. 1A and FIG. 1B, and thus will not be repeated hereinafter.

Referring to FIG. 2A, in the optical lens 100 of FIG. 2A, the light absorbing layer 120 and the optical membrane 130 are disposed on a same surface (for example, surface S1) of the lens 110, and the optical membrane 130 is located between the light absorbing layer 120 and the lens 110. In the present embodiment, the surface S1 may be the object-side surface or the image-side surface.

In the optical membrane 130, the number of the at least one first layer 132 may be two, and the number of the at least one second layer 134 may be two. However, the invention is not limited thereto. In simulation data plots of FIG. 2B, the material of the light absorbing layer 120 is $Ti_3O_5$, and the thickness of the light absorbing layer 120 is 400 nm. The material of the first layers 132 is $Ti_3O_5$, and the thicknesses of the first layers 132 arranged along the optical axis direction DT are sequentially 18 nm and 26 nm. The material of the second layers 134 is silicon dioxide, and the thicknesses of the second layers 134 arranged along the optical axis direction DT are sequentially 314 nm and 39 nm. Under this structure, transmittance of the peripheral region A2 in the optical axis direction DT and transmittance of the peripheral region A2 in a reverse direction of the optical axis direction DT may be below 8% (Referring to the curves L1, L2 in FIG. 2B) within a wavelength range of visible light (400 nm to 700 nm). Reflectance of the peripheral region A2 in the optical axis direction DT may be below 8% (Referring to the curve L3 in FIG. 2C) within a wavelength range of visible light (400 nm to 700 nm), and reflectance of the peripheral region A2 in the reverse direction of the optical axis direction DT may be below 16% (Referring to the curve L4 in FIG. 2C) within a wavelength range of visible light (400 nm to 700 nm). It should be mentioned that the number, the thickness, the material or the relative arrangement relationship of the at least one light absorbing layer 120 and the at least one optical membrane 130 (including the at least one first layer 132 and the at least one second layer 134) can be altered based on design requirements, and the invention is not limited thereto.

Referring to FIG. 3A, in the optical lens 100 of FIG. 3A, the light absorbing layer 120 and the optical membrane 130 are disposed on a same surface (for example, surface S1) of the lens 110, and the light absorbing layer 120 is located between the optical membrane 130 and the lens 110. In the present embodiment, the surface S1 may be the object-side surface or the image-side surface.

In the optical membrane 130, the number of the at least one first layer 132 may be two, and the number of the at least one second layer 134 may be three, but the invention is not limited thereto. In simulation data plots of FIG. 3B, the material of the light absorbing layer 120 is $Ti_3O_5$, and the thickness of the light absorbing layer 120 is 400 nm. The material of the first layers 132 is $Ti_3O_5$, and the thicknesses of the first layers 132 arranged along the optical axis direction DT are sequentially 115 nm and 16 nm. The material of the second layers 134 is silicon dioxide, and the thicknesses of the second layers 134 arranged along the optical axis direction DT are sequentially 12 nm, 20 nm and 84 nm. Under this structure, transmittance of the peripheral region A2 in the optical axis direction DT and transmittance of the peripheral region A2 in the reverse direction of the optical axis direction DT may be below 6% (Referring to the curves L1, L2 in FIG. 3B) within a wavelength range of visible light (400 nm to 700 nm). Reflectance of the peripheral region A2 in the optical axis direction DT may be below 9% (Referring to the curve L3 in FIG. 3C) within a wavelength range of visible light (400 nm to 700 nm), and reflectance of the peripheral region A2 in the reverse direction of the optical axis direction DT may be below 4% (Referring to the curve L4 in FIG. 3C) within a wavelength range of visible light (400 nm to 700 nm). In comparison with the design in FIG. 2A, reflectance of the peripheral region A2 in the reverse direction of the optical axis direction DT is lower. Therefore, the present embodiment can achieve higher light absorbance under approximately the same transmittance. It should be mentioned that the number, the thickness, the material or the relative arrangement relationship of the at least one light absorbing layer 120 and the at least one optical membrane 130 (including the at least one first layer 132 and the at least one second layer 134) can be altered based on design requirements, and the invention is not limited thereto.

Referring to FIG. 4A, in the optical lens 100 of FIG. 4A, the number of the at least one light absorbing layer 120 is one. The number of the at least one optical membrane 130 is two. The light absorbing layer 120 and the optical membranes 130 are disposed on a same surface (for example, surface S1) of the lens 110, and the light absorbing layer 120 is located between the optical membranes 130. In the present embodiment, the surface S1 may be the object-side surface or the image-side surface.

In each of the optical membranes 130, the number of the at least one first layer 132 may be one, and the number of the at least one second layer 134 may be two. However, the invention is not limited thereto. In simulation data plots of FIG. 4B, the material of the light absorbing layer 120 is $Ti_3O_5$, and the thickness of the light absorbing layer 120 is 430 nm. The material of the first layers 132 is $Ti_3O_5$, and the thicknesses of the first layers 132 arranged along the optical axis direction DT are sequentially 20 nm and 39 nm. The material of the second layers 134 is silicon dioxide, and the thicknesses of the second layers 134 arranged along the optical axis direction DT are sequentially 20 nm, 35 nm, 20 nm and 99 nm. Under this structure, transmittance of the peripheral region A2 in the optical axis direction DT and transmittance of the peripheral region A2 in a reverse direction of the optical axis direction DT may be below 7% (Referring to the curves L1, L2 in FIG. 4B) within a wavelength range of visible light (400 nm to 700 nm). Reflectance of the peripheral region A2 in the optical axis direction DT may be below 8% (Referring to the curve L3 in FIG. 4C) within a wavelength range of visible light (400 nm to 700 nm), and reflectance of the peripheral region A2 in the reverse direction of the optical axis direction DT may be below 4% (Referring to the curve L4 in FIG. 4C) within a wavelength range of visible light (400 nm to 700 nm). In comparison with the design in FIG. 2A, reflectance of the peripheral region A2 in the reverse direction of the optical axis direction DT is lower. Therefore, it can achieve higher light absorbance under approximately the same transmittance. It should be mentioned that the number, the thickness, the material or the relative arrangement relationship of the at least one light absorbing layer 120 and the at least one optical membrane 130 (including the at least one first layer 132 and the at least one second layer 134) can be altered based on design requirements, and the invention is not limited thereto.

Referring to FIG. 5A, in the optical lens 100 of FIG. 5A, the number of the at least one light absorbing layer is two. The number of the at least one optical membrane is one. The light absorbing layers 120 and the optical membrane 130 are disposed on a same surface (for example, surface S1) of the lens 110, and the optical membrane 130 is located between the light absorbing layers 120. In the present embodiment, the surface S1 may be the object-side surface or the image-side surface.

In optical membrane 130, the number of the at least one first layer 132 may be two, and the number of the at least one second layer 134 may be three, but the invention is not limited thereto. In simulation data plots of FIG. 5B, the material of the light absorbing layers 120 is $Ti_3O_5$, and the thicknesses of the light absorbing layers 120 are respectively 400 nm. The material of the first layers 132 is $Ti_3O_5$, and the thicknesses of the first layers 132 arranged along the optical axis direction DT are sequentially 17 nm and 12 nm. The material of the second layers 134 is silicon dioxide, and the thicknesses of the second layers 134 arranged along the optical axis direction DT are sequentially 20 nm, 90 nm and 30 nm. Under this structure, transmittance of the peripheral region A2 in the optical axis direction DT and transmittance of the peripheral region A2 in the reverse direction of the optical axis direction DT may be below 1% (Referring to the curves L1, L2 in FIG. 5B) within a wavelength range of visible light (400 nm to 700 nm). Reflectance of the peripheral region A2 in the optical axis direction DT may be below 9% (Referring to the curve L3 in FIG. 5C) within a wavelength range of visible light (400 nm to 700 nm), and reflectance of the peripheral region A2 in the reverse direction of the optical axis direction DT may be below 16% (Referring to the curve L4 in FIG. 5C) within a wavelength range of visible light (400 nm to 700 nm). In comparison with the design in FIG. 3A, transmittance of the peripheral region A2 in the optical axis direction DT and transmittance of the peripheral region A2 in the reverse direction of the optical axis direction DT are both lower. It should be mentioned that the number, the thickness, the material or the relative arrangement relationship of the at least one light absorbing layer 120 and the at least one optical membrane 130 (including the at least one first layer 132 and the at least one second layer 134) can be altered based on design requirements, and the invention is not limited thereto.

Furthermore, in the embodiments of FIG. 2 to FIG. 5, an anti-reflection layer (AR layer) may be optionally formed on one of the surfaces S1 and S2 of the lens 110, for example a surface (for example, surface S2) opposite to the coating surface (for example, surface S1) to further reduce reflectance.

Figure 6A:
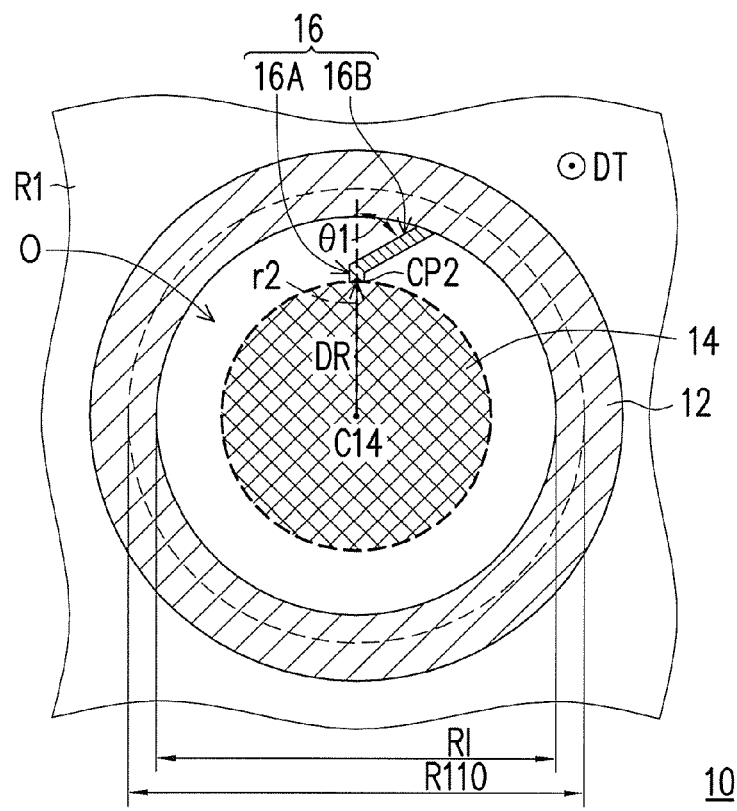
FIG. 6A is a top schematic view illustrating a fixture for manufacturing an optical lens according to a second embodiment of the present invention.
Figure 6B:
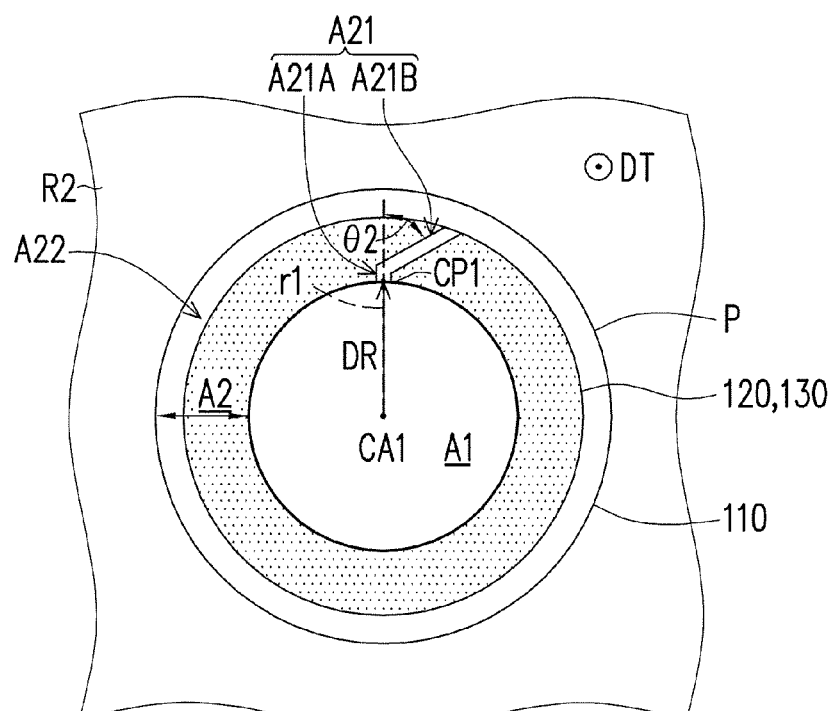
FIG. 6B is a top schematic view illustrating the optical lens according to the second embodiment of the present invention.
Figure 7A:
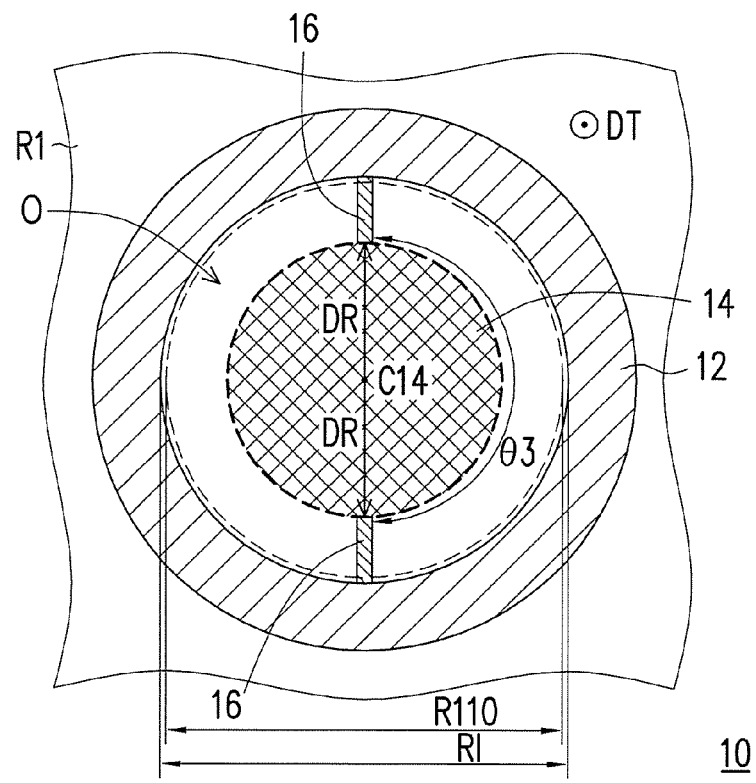
FIG. 7A is a top schematic view illustrating a fixture for manufacturing an optical lens according to a third embodiment of the present invention.
Figure 7B:
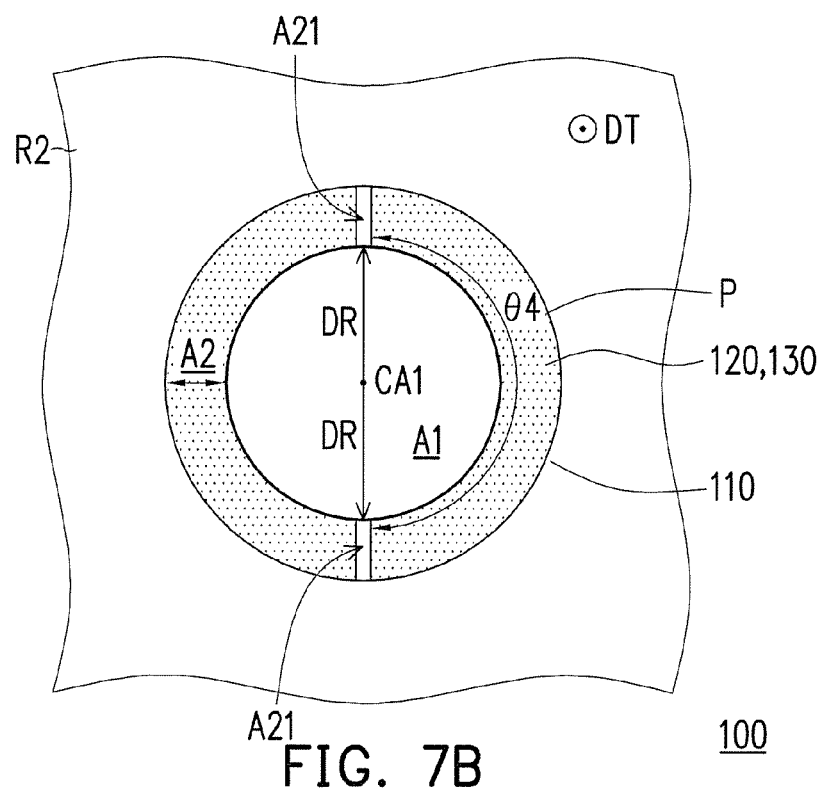
FIG. 7B is a top schematic view illustrating the optical lens according to the third embodiment of the present invention.
Figure 8A:
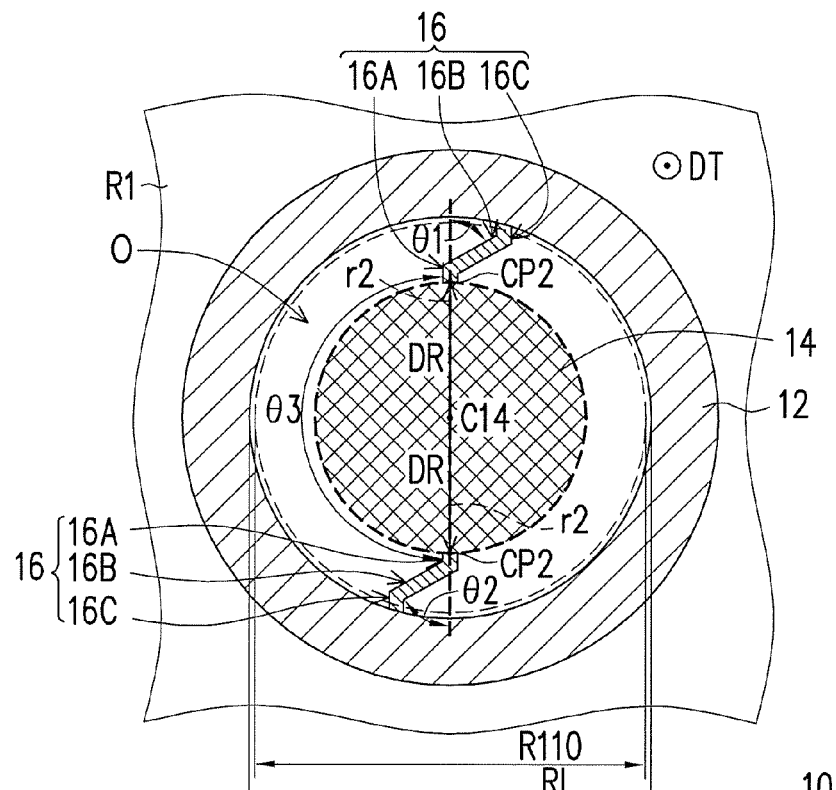
FIG. 8A is a top schematic view illustrating a fixture for manufacturing an optical lens according to a fourth embodiment of the present invention.
Figure 8B:
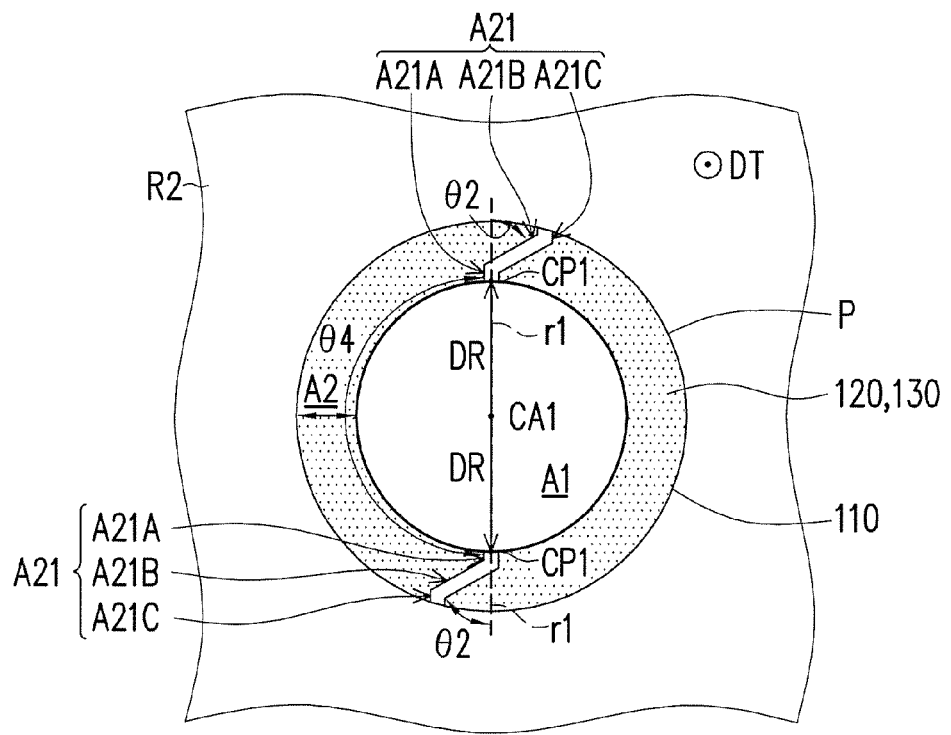
FIG. 8B is a top schematic view illustrating the optical lens according to the fourth embodiment of the present invention.
Figure 9A:
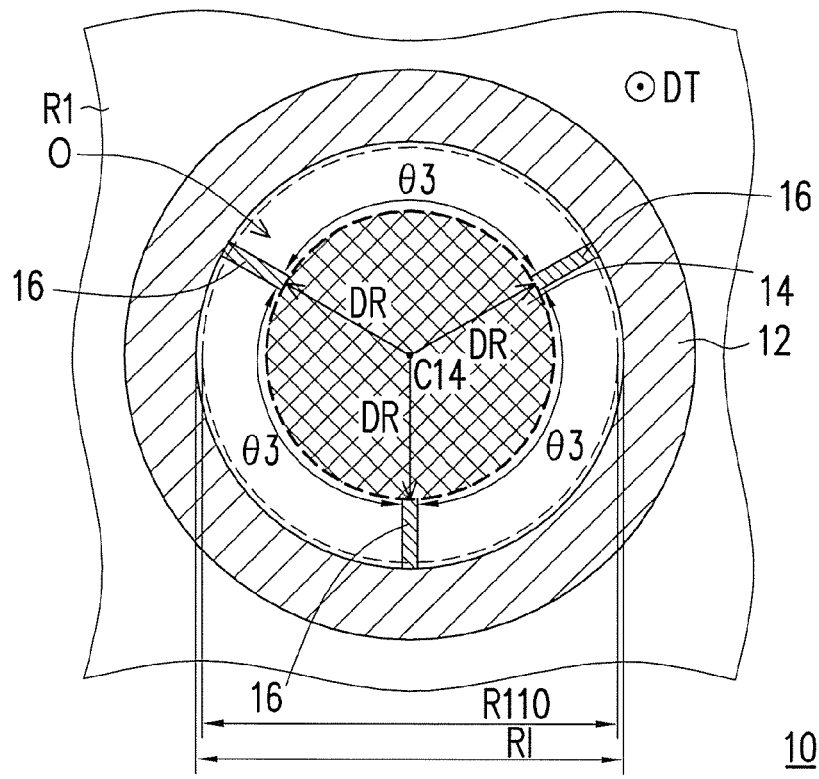
FIG. 9A is a top schematic view illustrating a fixture for manufacturing an optical lens according to a fifth embodiment of the present invention.
Figure 9B:
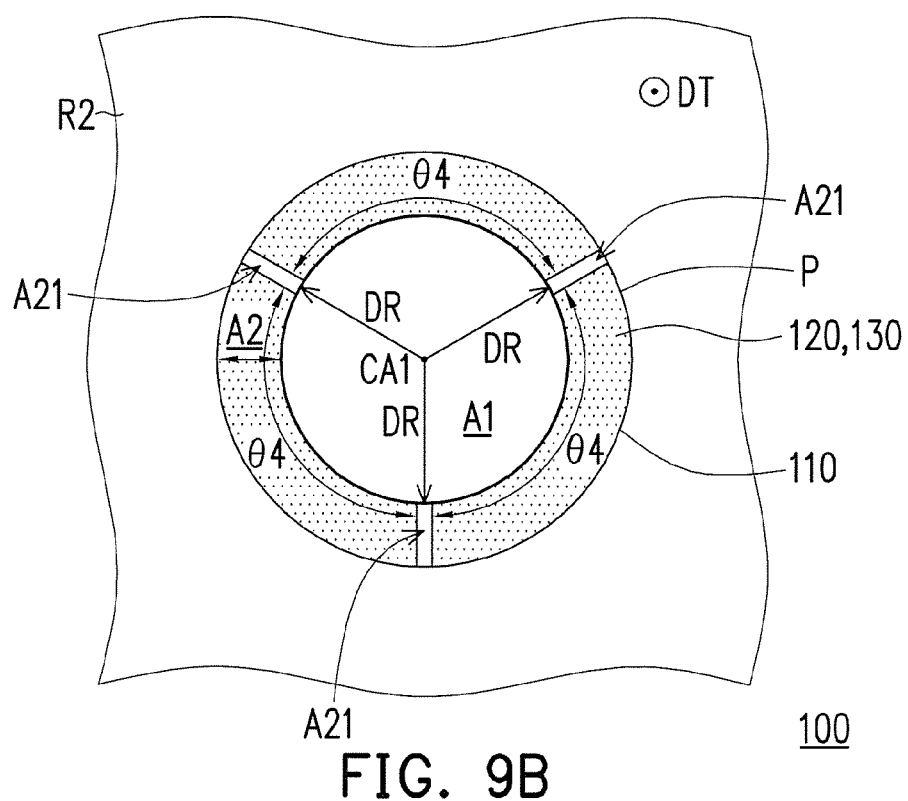
FIG. 9B is a top schematic view illustrating the optical lens according to the fifth embodiment of the present invention.
Figure 10A:
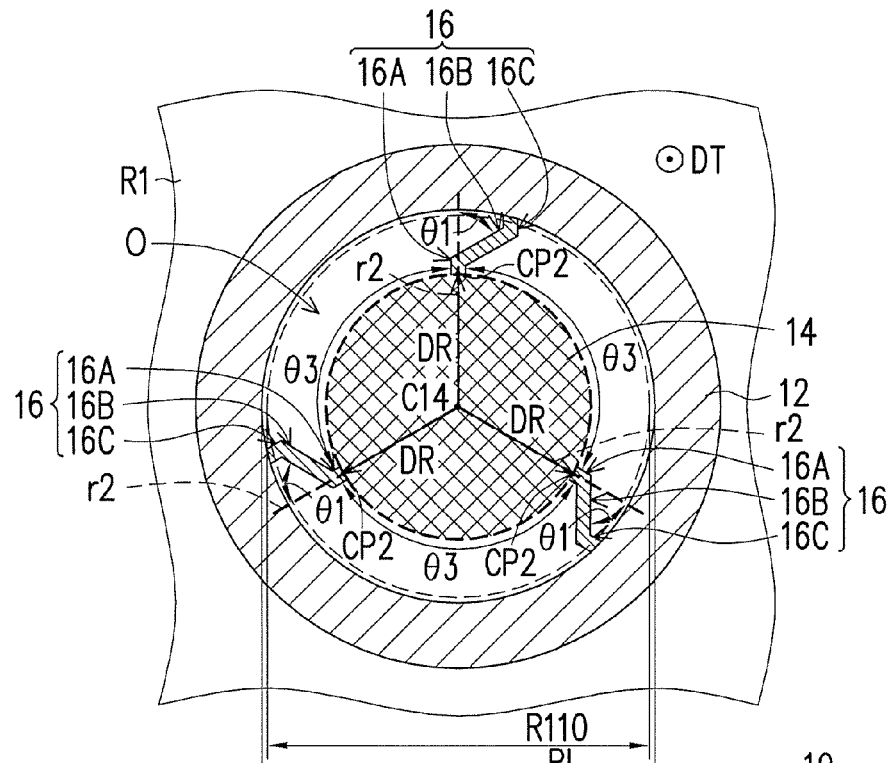
FIG. 10A is a top schematic view illustrating a fixture for manufacturing an optical lens according to a sixth embodiment of the present invention.
Figure 10B:
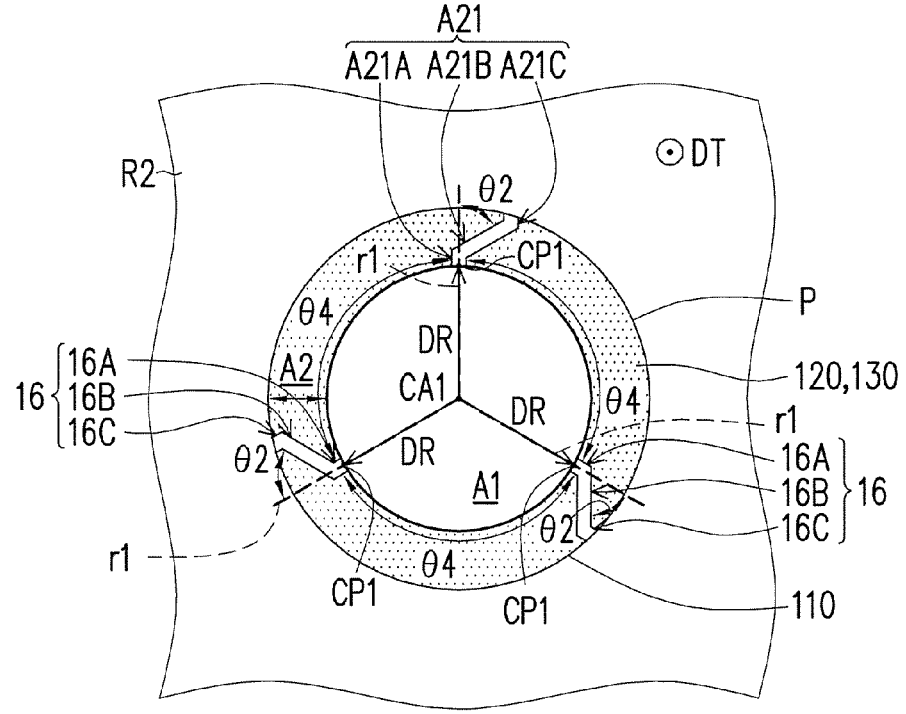
FIG. 10B is a top schematic view illustrating the optical lens according to the sixth embodiment of the present invention.
Figure 11A:
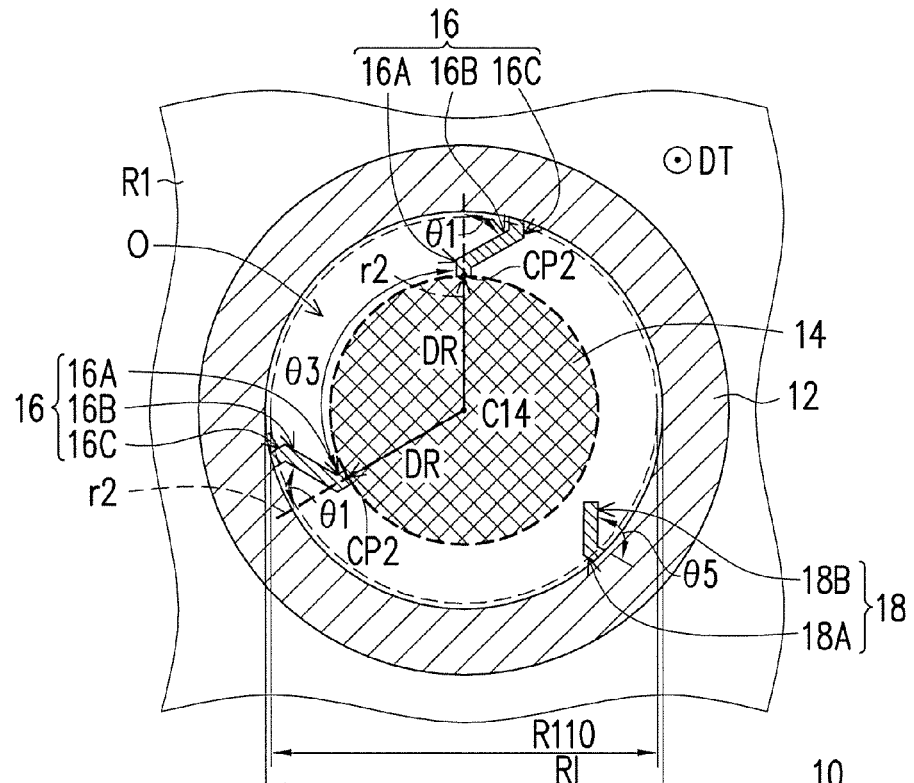
FIG. 11A is a top schematic view illustrating a fixture for manufacturing an optical lens according to a seventh embodiment of the present invention.
Figure 11B:
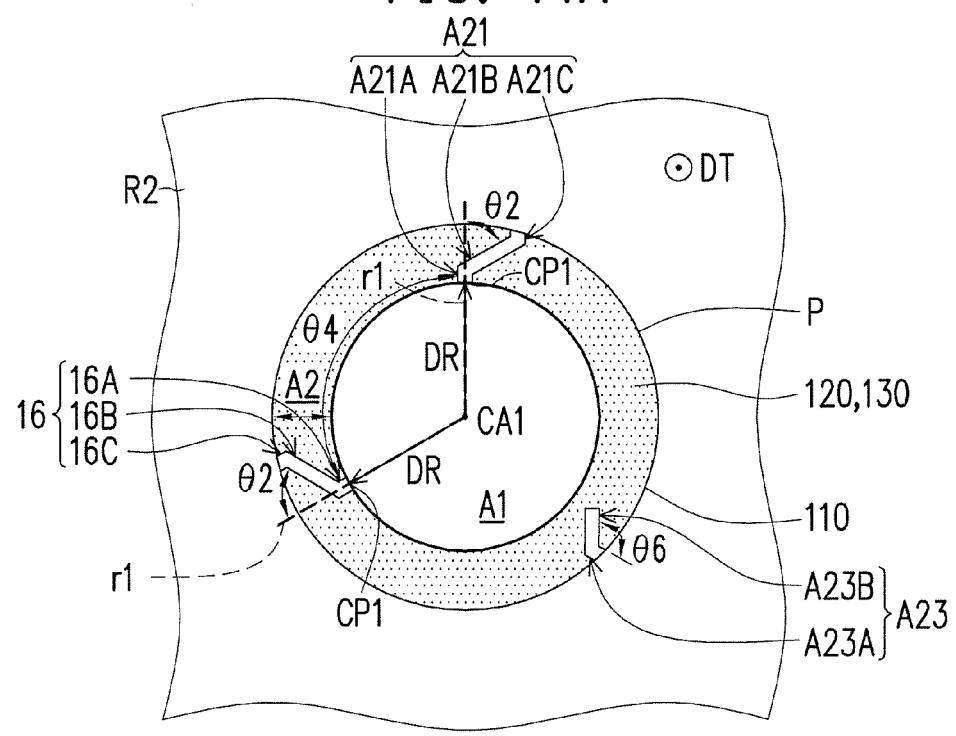
FIG. 11B is a top schematic view illustrating the optical lens according to the seventh embodiment of the present invention.

The optical lens may have other types of embodiments according to different fixtures for manufacturing the optical lens. The following paragraphs will explain other optical lenses and corresponding fixtures thereof in collaboration with FIG. 6A to FIG. 11B. FIG. 6A is a top schematic view illustrating a fixture for manufacturing an optical lens according to a second embodiment of the present invention. FIG. 6B is a top schematic view illustrating the optical lens according to the second embodiment of the present invention. FIG. 7A is a top schematic view illustrating a fixture for manufacturing an optical lens according to a third embodiment of the present invention. FIG. 7B is a top schematic view illustrating the optical lens according to the third embodiment of the present invention. FIG. 8A is a top schematic view illustrating a fixture for manufacturing an optical lens according to a fourth embodiment of the present invention. FIG. 8B is a top schematic view illustrating the optical lens according to the fourth embodiment of the present invention. FIG. 9A is a top schematic view illustrating a fixture for manufacturing an optical lens according to a fifth embodiment of the present invention. FIG. 9B is a top schematic view illustrating the optical lens according to the fifth embodiment of the present invention. FIG. 10A is a top schematic view illustrating a fixture for manufacturing an optical lens according to a sixth embodiment of the present invention. FIG. 10B is a top schematic view illustrating the optical lens according to the sixth embodiment of the present invention. FIG. 11A is a top schematic view illustrating a fixture for manufacturing an optical lens according to a seventh embodiment of the present invention. FIG. 11B is a top schematic view illustrating the optical lens according to the seventh embodiment of the present invention.

In FIG. 6A, FIG. 7A, FIG. 8A, FIG. 9A, FIG. 10A and FIG. 11A, the thin dashed line is marked as an edge of the lens, and the thick dashed line is marked as a boundary between the central region and the peripheral region. A region inside the thick dashed line is corresponding to the central region of the lens. A region outside the thick dashed line and inside the thin dashed line is corresponding to the peripheral region of the lens.

Referring to FIG. 6A and FIG. 6B, the optical lens 100 of FIG. 6B is, for example, made by the use of a coating process. During the coating process, the lens 110 of the optical lens 100 is fixed by the fixture 10 in FIG. 6A for forming the at least one light absorbing layer 120 and the at least one optical membrane 130 in the peripheral region A2 of the lens 110. The material, the relative arrangement relationship or the effects of the lens 110, the at least one light absorbing layer 120 and the at least one optical membrane 130 can refer to the description corresponding to FIG. 1A to FIG. 5B, and thus related description thereof are not repeated hereinafter.

The fixture 10 may include a carrier plate 12, a shield plate 14, and at least one first connecting portion 16. The carrier plate 12 may be used for supporting the lens 110, and a material of the carrier plate 12 is, for example, stainless steel or metal. However, the invention is not limited thereto. The carrier plate 12 has at least one opening O. One opening O is illustrated schematically in FIG. 6A, but the invention is not limited thereto.

The shield plate 14 is located in the opening O and shields the central region A1 of the lens 110. In this way, during the coating process, the coating material (such as the material of the at least one light absorbing layer 120 or the material of the at least one optical membrane 130) may be prevented from being formed on the central region A1. Furthermore, after finishing the coating process, the at least one light absorbing layer 120 and the at least one optical membrane 130 expose the central region A1. A material of the shield plate 14 is, for example, stainless steel or metal, but the invention is not limited thereto.

The at least one first connecting portion 16 is connected to the carrier plate 12 and the shield plate 14, and the at least one first connecting portion 16 is adapted to support the peripheral region A2 of the lens 110. A material of the at least one first connecting portion 16 is, for example, stainless steel or metal, but the invention is not limited thereto. In the present embodiment, the carrier plate 12, the shield plate 14 and the at least one first connecting portion 16 may be located on the same horizontal plane. However, the carrier plate 12 and the shield plate 14 may be located on different horizontal planes based on different design requirements. Under this structure, the at least one first connecting portion 16 is connected between the horizontal plane of the carrier plate 12 and the horizontal plane of the shield plate 14.

During the coating process, the coating material is formed on the surface of the lens 110 facing the fixture 10. Not only the shield plate 14 but also the at least one first connecting portion 16 shields the coating material. Therefore, in the optical lens 110 formed by the fixture 10, the at least one light absorbing layer 120 and the at least one optical membrane 130 not only expose the central region A1 respectively, but also expose the region shielded by the at least one first connecting portion 16 respectively. In detail, at least one first strip shape gap region A21 is formed in the peripheral region A2 corresponding to the at least one first connecting portion 16. The at least one first strip shape gap region A21 is connected to the central region A1, and the at least one first strip shape gap region A21 is connected between the central region A1 and a peripheral edge P of the lens 110. The at least one light absorbing layer 120 and the at least one optical membrane 130 further expose the at least one first strip shape gap region A21 respectively.

In the present embodiment, the number of the at least one first connecting portion 16 is one. A point connecting each first connecting portion 16 and the shield plate 14 is defined as a second connecting point CP2. A straight line passing through the second connecting point CP2 from a center C14 of the shield plate 14 along a radial direction DR is defined as a second radius line r2. An angle θ1 between orthogonal projections of each first connecting portion 16 and the second radius line r2 on a reference plane R1 which is vertical to the optical axis direction DT of the optical lens 100 is within a range of 30 degrees to 60 degrees. As shown in FIG. 6A, the first connecting portion 16 may include a plurality of first sub connecting portions (such as first sub connecting portions 16A and 16B) being serially connected to each other. The first sub connecting portion 16A is connected between the second connecting point CP2 and the first sub connecting portion 16B, and an angle between the first sub connecting portion 16B and the second radius line r2 is, for example, equal to the angle θ1.

The number of the at least one first strip shape gap region A21 is also one. A point connecting each first strip shape gap region A21 and the central region A1 is defined as a first connecting point CP1. A straight line passing through the first connecting point CP1 from a center CA1 of the lens 110 along a radial direction (same as the radial direction DR of the shield plate 14) is defined as a first radius line r1. An angle θ2 between orthogonal projections of each first strip shape gap region A21 and the first radius line r1 on a reference plane R2 which is vertical to the optical axis direction DT is within a range of 30 degrees to 60 degrees. The first strip shape gap region A21 may include a plurality of first sub regions (such as first sub regions A21A and A21B) being serially connected to each other, where a shape and a position of the first sub region A21A are corresponding to the first sub connecting portion 16A, and a shape and a position of the first sub region A21B are corresponding to the first sub connecting portion 16B. The aforesaid conditions of shape corresponding may include a condition that the shapes are the same or similar to each other and the sizes are the same or similar to each other. The first sub region A21A is connected between the first connecting point CP1 and the first sub region A21B, and an angle between the first sub region A21B and the first radius line r1 is, for example, equal to the angle θ2.

Under the above structure, the covering rate of the at least one light absorbing layer 120 and the at least one optical membrane 130 covering the peripheral region A2 is ideal. Therefore, it may improve stray light issue preferably.

It should be mentioned that the carrier plate 12 may also support the edge of the lens 110 during the coating process under a condition that an inner diameter R1 of the carrier plate 12 (i.e., a diameter of the opening O) is less than the diameter R110 of the lens 110. In this way, the stability of the support is enhanced, and damage of the first connecting portion 16 caused by excessive force may be reduced. Therefore, the process yield may be enhanced. It is noted that the peripheral region A2 of the lens 110 further has a circular gap region A22 because the edge of the lens 110 is shielded by the carrier plate 12 during the coating process. The circular gap region A22 is the region shielded by the carrier plate 12 during the coating process. The at least one light absorbing layer 120 and the at least one optical membrane 130 further expose the circular gap region A22 respectively. In an optical imaging lens using the optical lens 100, the circular gap region A22 may be shielded by other elements (such as clamping mechanism) of the optical imaging lens. Therefore, the stray light issue is avoided. It should be mentioned that a size of the circular gap region A22 is different according to the diameter E110 of the lens 110, thus the invention is not limited to those illustrated in FIG. 6B. If the inner radius R1 of the carrier plate 12 is larger than or equal to the diameter R110 of the lens 110, the peripheral region A2 of the lens 110 may not has the circular gap region A22 (Referring to the optical lens in FIG. 7B, FIG. 8B, FIG. 9B, FIG. 10B and FIG. 11B).

In the following embodiments, while illustrating the fixtures in FIG. 7A, FIG. 8A, FIG. 9A, FIG. 10A, and FIG. 11A, only the main differences between the fixtures thereof and the fixture in FIG. 6A will be illustrated. The similar or the same elements and the related descriptions in different embodiments may refer to the corresponding contents corresponding to FIG. 6A, thus the related descriptions thereof are not repeated hereinafter. Moreover, while illustrating the optical lens in FIG. 7B, FIG. 8B, FIG. 9B, FIG. 10B, and FIG. 11B, only the main differences between the optical lenses thereof and the optical lens in FIG. 6B will be illustrated. The similar or the same elements and the related descriptions in different embodiments may refer to the corresponding contents corresponding to FIG. 1A, FIG. 1B and FIG. 6B, thus the related descriptions thereof are not repeated hereinafter.

Referring to FIG. 7A and FIG. 7B, in the fixture 10 of FIG. 7A, the number of the at least one first connecting portion 16 is two, and a shape of each of the first connecting portions 16 is straight strip shape. An orthogonal projection of each of the first connecting portions 16 on the reference plane R1 extends, for example, along a radial direction DR of the shielding plate 14, and an angle θ3 between the orthogonal projections of the first connecting portions 16 on the reference plane R1 is, for example, 180 degrees.

In the optical lens 100 of FIG. 7B, the number of the at least one first strip shape gap region A21 is also two, and a shape of each of the first strip shape gap regions A21 is straight strip shape. An orthogonal projection of each of the first strip shape gap regions A21 on the reference plane R2 extends, for example, along a radial direction (same as the radial direction DR of the shielding plate 14) of the central region A1, and an angle θ4 between the orthogonal projections of the first strip shape gap regions A21 on the reference plane R2 is, for example, 180 degrees.

Under the above structure, the fixture 10 may support the lens 110 more steadily, and damage of the first connecting portion 16 caused by excessive force may be reduced. Therefore, the process yield may be enhanced.

It should be mentioned that the inner diameter R1 of the carrier plate 12 is larger than the diameter R110 of the lens 110, therefore the peripheral region A2 of the lens 110 does not have the circular gap region A22 as shown in FIG. 6B. Accordingly, the lens 110 has a better coverage rate.

However, in another embodiment, the inner radius RI of the carrier plate 12 may be less than the diameter R110 of the lens 110 to improve stability of the support and to reduce the damage of the first connecting portion 16 caused by excessive force. Under this structure, the peripheral region A2 of the lens 110 has the circular gap region A22. The improvement is applied to the following embodiments, and thus related descriptions thereof are not repeated hereinafter.

Referring to FIG. 8A and FIG. 8B, in the fixture 10 of FIG. 8A, the number of the at least one first connecting portion 16 is two. Each of the first connecting portions 16 not only includes the first sub connecting portions 16A and 16B, but also includes a first sub connecting portion 16C, where the first sub connecting portion 16B is connected between the first sub connecting portion 16A and the first sub connecting portion 16C. Besides, an angle θ3 (i.e., an angle between the orthogonal projections of the first sub connecting portions 16A on the reference plane R1) between the orthogonal projections of the first connecting portions 16 on the reference plane R1 is, for example, 180 degrees.

In the optical lens 100 of FIG. 8B, the number of the at least one first strip shape gap region A21 is also two. Each of the first strip shape gap regions A21 not only includes the first sub regions A21A and A21B, but also includes a first sub region A21C, where the first sub region A21C is corresponding to the first sub connecting portion 16C, and the first sub region A21B is connected between the first sub region A21A and the first sub region A21C. Besides, an angle θ4 (which is also an angle between the orthogonal projections of the first sub regions A21A on the reference plane R2) between the orthogonal projections of the first strip shape gap regions A21 on the reference plane R2 is, for example, 180 degrees.

Under the above structure, the fixture 10 may support the lens 110 more steadily, and damage of the first connecting portion 16 caused by excessive force may be reduced. Therefore, the process yield is enhanced. Besides, with an appropriate design of angle θ1, the falling issue caused by the lens 110 being subject to vibration is reduced.

Referring to FIG. 9A and FIG. 9B, in the fixture 10 of FIG. 9A, the number of the at least one first connecting portion 16 is three, and a shape of the each of the first connecting portions 16 is straight strip shape. An orthogonal projection of each of the first connecting portions 16 on the reference plane R1 extends, for example, along the radial direction DR of the shielding plate 14, and an angle θ3 between the orthogonal projections of the first connecting portions 16 on the reference plane R1 is, for example, 120 degrees.

In the optical lens 100 of FIG. 9B, the number of the at least one first strip shape gap region A21 is also three, and a shape of each of the first strip shape gap regions A21 is straight strip shape. An orthogonal projection of each of the strip shape gap regions A21 on the reference plane R2 extends, for example, along a radial direction (same as the radial direction DR of the shielding plate 14) of the central region A1, and an angle θ4 between the orthogonal projections of the first strip shape gap regions A21 on the reference plane R2 is, for example, 120 degrees.

Under the above structure, the fixture 10 may support the lens 110 more steadily, and damage of the first connecting portion 16 caused by excessive force may be reduced. Therefore, the process yield is enhanced. Besides, in comparison with designing a specific θ1 to improve the falling issue caused by the lens 110 being subject to vibration in FIG. 8A, increasing the number of the first connecting portions 16 in FIG. 9A may also improve the falling issue caused by the lens 110 being subject to vibration, and the improvement in FIG. 9A is better than the improvement in FIG. 8A.

Referring to FIG. 10A and FIG. 10B, in the fixture 10 of FIG. 10A, the number of the at least one first connecting portion 16 is three. Each of the first connecting portions 16 not only includes the first sub connecting portions 16A and 16B, but also includes a first sub connecting portion 16C, where the first sub connecting portion 16B is connected between the first sub connecting portion 16A and the first sub connecting portion 16C. Besides, an angle θ3 (which is also an angle between the orthogonal projections of the first sub connecting portions 16A on the reference plane R1) between the orthogonal projections of the first connecting portions 16 on the reference plane R1 is, for example, 120 degrees.

In the optical lens 100 of FIG. 10B, the number of the at least one first strip shape gap region A21 is also three. Each of the first strip shape gap region A21 not only includes the first sub regions A21A and A21B, but also includes a first sub region A21C, where the first sub region A21C is corresponding to the first sub connecting portion 16C, and the first sub region A21B is connected between the first sub region A21A and the first sub region A21C. Besides, an angle θ4 (which is also an angle between the orthogonal projections of the first sub regions A21A on the reference plane R2) between the orthogonal projections of the first strip shape gap regions A21 on the reference plane R2 is, for example, 120 degrees.

Under the above structure, the fixture 10 may support the lens 110 more steadily, and damage of the first connecting portion 16 caused by excessive force may be reduced. Therefore, the process yield is enhanced. Besides, the fixture 10 may improve the falling issue caused by the lens 110 being subject to vibration. Furthermore, in comparison with the design in FIG. 9B, the multi-section design of the first strip shape gap region A21 in FIG. 10B is contributed to reduce stray light passing through the peripheral region A2 of the lens 110 via the first strip shape gap region A21. Therefore, stray light with specific angles may be suppressed, and image quality of the optical imaging lens using the optical lens 100 may be improved.

Referring to FIG. 11A and FIG. 11B, in the fixture 10 of FIG. 11A, the number of the at least one first connecting portion 16 is two. Each of the first connecting portions 16 not only includes the first sub connecting portions 16A and 16B, but also includes a first sub connecting portion 16C, where the first sub connecting portion 16B is connected between the first sub connecting portion 16A and the first sub connecting portion 16C. Besides, an angle θ3 (which is also an angle between the orthogonal projections of the first sub connecting portions 16A on the reference plane R1) between the orthogonal projections of the first connecting portions 16 on the reference plane R1 is, for example, 120 degrees.

In the optical lens 100 of FIG. 11B, the number of the at least one first strip shape gap region A21 is also two. Each of the first strip shape gap regions A21 not only includes the first sub regions A21A and A21B, but also includes a first sub region A21C, where the first sub region A21C is corresponding to the first sub connecting portion 16C, and the first sub region A21B is connected between the first sub region A21A and the first sub region A21C. Besides, an angle θ4 (which is also an angle between the orthogonal projections of the first sub regions A21A on the reference plane R2) between the orthogonal projections of the first strip shape gap regions A21 on the reference plane R2 is, for example, 120 degrees.

The fixture 10 further includes at least one second connecting portion 18 located in the opening O. The at least one second connecting portion 18 is connected to the carrier plate 12 and is not connected to the shield plate 14. The at least one second connecting portion 18 is adapted to support the peripheral region A2 of the lens 110 and defines at least one second strip shape gap region A23 which is not connected to the central region A1 in the peripheral region A2. In detail, during the coating process, not only the shield plate 14 and the at least one first connecting portion 16 but also the at least one second connecting portion 18 shields the coating material. Therefore, in the optical lens 100 formed by the fixture 10, the at least one light absorbing layer 120 and the at least one optical membrane 130 not only expose the central region A1 and the region shielded by the at least one first connecting portion 16 respectively, but also expose the region shielded by the at least one second connecting portion 18 respectively. In detail, at least one second strip shape gap region A23 is formed in the peripheral region A2 corresponding to the at least one second connecting portion 18. The at least one second strip shape gap region A23 is connected to the peripheral edge P of the lens 110 and is not connected to the central region A1. The at least one light absorbing layer 120 and the at least one optical membrane 130 further expose the at least one second strip shape gap region A23 respectively.

In the present embodiment, the number of the at least one second connecting portion 18 is one. The second connecting portion 18 may include a plurality of second sub connecting portions (such as second sub connecting portions 18A and 18B) being serially connected to each other. An angle θ5 between the orthogonal projections of two interconnected second sub connecting portions 18A and 18B on the reference plane R1 which is vertical to the optical axis direction DT of the optical lens 100 is, for example, within a range of 120 degrees to 150 degrees.

The number of the at least one second strip shape gap region A23 is also one. The second strip shape gap region A23 may include a plurality of second sub regions (such as second sub regions A23A and A23B) being serially connected to each other, where a shape and a position of the second sub region A23A are corresponding to the second sub connecting portion 18A, and a shape and a position of the second sub region A23B are corresponded to the second sub connecting portion 18B. An angle θ6 between the orthogonal projections of two interconnected second sub regions A23A and A23B on the reference plane R2 which is vertical to the optical axis direction DT of the optical lens 100 is within a range of 120 degrees to 150 degrees.

Under the above structure, the fixture 10 may support the lens 110 more steadily, and damage of the first connecting portion 16 caused by excessive force may be reduced. Therefore, the process yield is enhanced. Besides, the fixture 10 may improve the falling issue caused by the lens 110 being subject to vibration. Moreover, in comparison with the design in FIG. 10B, the second strip shape gap region A23 and multi-section design thereof in FIG. 11B are contributed to further reduce stray light with specific angles. Furthermore, the covering rate of the at least one light absorbing layer 120 and the at least one optical membrane 130 covering the peripheral region A2 is increased with respect to FIG. 10B, such that the image quality is better.

Based on the above, advantageous effects of the optical lens according to the embodiments of the invention are as follows. By disposing at least one light absorbing layer and at least one optical membrane on the peripheral region of the lens, transmittance and reflectance of the peripheral region of the lens are reduced. Thus, the stray light issue is improved.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. An optical lens, comprising:
a lens, having a central region and a peripheral region surrounding the central region;
at least one light absorbing layer, disposed on the lens, wherein each light absorbing layer is located in the peripheral region and exposes the central region; and
at least one optical membrane, disposed on the lens, and the at least one optical membrane and the at least one light absorbing layer overlapping in an optical axis direction of the optical lens, wherein each optical membrane is located in the peripheral region and exposes the central region, each optical membrane comprises at least one first layer and at least one second layer, refraction index of the at least one second layer is lower than refraction index of the at least one first layer, the at least one first layer and the at least one second layer are stacked alternatively, and at least one of extinction coefficients of the at least one first layer and the at least one second layer within a wavelength range of visible light is larger than zero.

2. The optical lens according to claim 1, wherein a number of the at least one light absorbing layer and a number of the at least one optical membrane are respectively one, and the light absorbing layer and the light optical membrane are respectively disposed on two opposing surfaces of the lens.

3. The optical lens according to claim 1, wherein a number of the at least one light absorbing layer and a number of the at least one optical membrane are respectively one, the light absorbing layer and the light optical membrane are disposed on a same surface of the lens, and the optical membrane is located between the light absorbing layer and the lens.

4. The optical lens according to claim 1, wherein a number of the at least one light absorbing layer and a number of the at least one optical membrane are respectively one, the light absorbing layer and the light optical membrane are disposed on a same surface of the lens, and the light absorbing layer is located between the optical membrane and the lens.

5. The optical lens according to claim 1, wherein a number of the at least one light absorbing layer is one, a number of the at least one optical membrane is two, the light absorbing layer and the optical membranes are disposed on a same surface of the lens, and the light absorbing layer is located between the optical membranes.

6. The optical lens according to claim 1, wherein a number of the at least one light absorbing layer is two, a number of the at least one optical membrane is one, the light absorbing layers and the optical membrane are disposed on a same surface of the lens, and the optical membrane is located between the light absorbing layers.

7. The optical lens according to claim 1, wherein a material of the at least one light absorbing layer comprises $Ti_xO_y$ or $Cr_xO_y$, x and y are respectively larger than zero, and $(x+y) \leq 1$, light absorbance of each light absorbing layer is larger than transmittance of the light absorbing layer plus reflectance of the light absorbing layer.

8. The optical lens according to claim 1, wherein a material of the at least one first layer comprises $Ti_xO_y$ or $Cr_xO_y$, x and y are respectively larger than zero, and $(x+y) \leq 1$, transmittance of each first layer is within a range of 20% to 80%.

9. The optical lens according to claim 1, wherein a material of the at least one second layer comprises silicon dioxide or silicon oxide.

10. The optical lens according to claim 1, wherein the peripheral region has at least one first strip shape gap region connected to the central region, and the at least one light absorbing layer and the at least one optical membrane further expose the at least one first strip shape gap region respectively.

11. The optical lens according to claim 10, wherein a point connecting each first strip shape gap region and the central region is defined as a first connecting point, a straight line passing through the first connecting point from a center of the lens along a radial direction is defined as a first radius line, an angle between orthogonal projections of each first strip shape gap region and the first radius line on a reference plane which is vertical to the optical axis direction is within a range of 30 degrees to 60 degrees.

12. The optical lens according to claim 10, wherein each first strip shape gap region is connected between the central region and a peripheral edge of the lens.

13. The optical lens according to claim 10, wherein the peripheral region further has at least one second strip shape gap region not connected to the central region, and the at least one light absorbing layer and the at least one optical membrane further expose the at least one second strip shape gap region respectively.

14. The optical lens according to claim 13, wherein each first strip shape gap region is connected between the central region and a peripheral edge of the lens.

* * * * *